US007907628B2

(12) United States Patent
Hall et al.

(10) Patent No.: US 7,907,628 B2
(45) Date of Patent: *Mar. 15, 2011

(54) PRIORITY BASED ARBITRATION FOR TDMA SCHEDULE ENFORCEMENT IN A MULTI-CHANNEL SYSTEM

(75) Inventors: Brendan Hall, Eden Prairie, MN (US);
Kevin Driscoll, Maple Grove, MN (US);
Philip J. Zumsteg, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 1868 days.

This patent is subject to a terminal disclaimer.

(21) Appl. No.: 10/993,926

(22) Filed: Nov. 19, 2004

(65) Prior Publication Data

US 2005/0129055 A1    Jun. 16, 2005

Related U.S. Application Data

(60) Provisional application No. 60/560,323, filed on Apr. 6, 2004, provisional application No. 60/523,785, filed on Nov. 19, 2003, provisional application No. 60/523,782, filed on Nov. 19, 2003, provisional application No. 60/523,783, filed on Nov. 19, 2003.

(51) Int. Cl.
*H04L 12/43* (2006.01)
(52) U.S. Cl. .................. 370/461; 370/235; 370/426
(58) Field of Classification Search .......... 370/280, 370/294, 321, 337, 347, 400, 442, 458, 461, 370/462, 463, 335, 342, 443, 468
See application file for complete search history.

(56) References Cited

U.S. PATENT DOCUMENTS

| | | | | | |
|---|---|---|---|---|---|
| 4,330,857 | A | * | 5/1982 | Alvarez et al. | 370/321 |
| 4,907,224 | A | * | 3/1990 | Scoles et al. | 370/443 |
| 5,343,474 | A | | 8/1994 | Driscoll | |
| 5,917,810 | A | * | 6/1999 | De Bot | 370/294 |
| 5,936,964 | A | * | 8/1999 | Valko et al. | 370/468 |
| 6,353,615 | B1 | * | 3/2002 | Bohne | 370/442 |
| 6,389,474 | B1 | * | 5/2002 | Chien et al. | 709/232 |
| 6,542,947 | B1 | | 4/2003 | Bühring | |
| 6,862,507 | B2 | * | 3/2005 | Altemare, Jr. et al. | 701/41 |
| 6,963,580 | B2 | * | 11/2005 | Chien et al. | 370/445 |
| 6,975,613 | B1 | * | 12/2005 | Johansson | 370/338 |
| 6,996,115 | B1 | * | 2/2006 | Budde et al. | 370/407 |
| 7,023,815 | B2 | * | 4/2006 | Zeira et al. | 370/321 |
| 7,099,959 | B1 | * | 8/2006 | Budde et al. | 709/252 |
| 7,102,383 | B2 | * | 9/2006 | Roger et al. | 326/39 |
| 7,149,204 | B2 | * | 12/2006 | Shoji et al. | 370/337 |
| 7,218,623 | B1 | * | 5/2007 | Proctor, Jr. | 370/335 |

(Continued)

FOREIGN PATENT DOCUMENTS

EP     0 383 475 A2    8/1990

(Continued)

*Primary Examiner* — Aung S Moe
*Assistant Examiner* — Vinncelas Louis
(74) *Attorney, Agent, or Firm* — Fogg & Powers LLC

(57) ABSTRACT

A multi-channel TDMA network having priority based is provided. A network includes a plurality of channels, and a plurality of nodes adapted to transmit and received data. Through each channel, every node is coupled to communicate data with every other node. Within each channel, each node is assigned a unique priority rank. Only the node with the highest priority rank is permitted to transmit data during a time slot. For each channel of the multi-channel network, the plurality of nodes are ranked in a different priority direction.

19 Claims, 8 Drawing Sheets

U.S. PATENT DOCUMENTS

| | | | |
|---|---|---|---|
| 2002/0067709 A1* | 6/2002 | Yamada et al. | 370/337 |
| 2003/0067873 A1* | 4/2003 | Fuhrmann et al. | 370/230 |
| 2004/0030949 A1* | 2/2004 | Kopetz et al. | 714/4 |
| 2004/0081193 A1* | 4/2004 | Forest et al. | 370/458 |
| 2004/0152490 A1* | 8/2004 | Aoyama et al. | 455/560 |
| 2005/0192741 A1* | 9/2005 | Nichols et al. | 701/207 |
| 2005/0243715 A1* | 11/2005 | Rausch et al. | 370/217 |

FOREIGN PATENT DOCUMENTS

| | | |
|---|---|---|
| GB | 2 236 606 A | 4/1991 |
| SU | 1 112 406 A | 9/1984 |
| WO | WO 01/13230 A1 | 2/2001 |

\* cited by examiner

PRIORITY BASED ARBITRATION FOR TDMA SCHEDULE ENFORCEMENT IN A MULTI-CHANNEL SYSTEM

CROSS REFERENCE TO RELATED APPLICATIONS

This application is related to and claims the benefit of the filing date of U.S. Provisional Application No. 60/523,785 entitled "PRIORITY BASED ARBITRATION FOR TDMA SCHEDULE ENFORCEMENT IN A DUAL LINK SYSTEM" filed on Nov. 19, 2003, and U.S. Provisional Application No. 60/560,323 entitled "MESSAGE AUTHENTICATION IN A COMMUNICATION NETWORK" filed on Apr. 6, 2004, and U.S. Provisional Application No. 60/523,782 entitled "HUB WITH INDEPENDENT TIME SYNCHRONIZATION" filed on Nov. 19, 2003, and U.S. Provisional Application No. 60/523,783 entitled "PARASITIC TIME SYNCHRONIZATION FOR A CENTRALIZED TDMA BASED COMMUNICATIONS GUARDIAN" filed on Nov. 19, 2003, all of which are incorporated herein by reference.

This application is also related to the following co-pending applications filed on even date herewith, all of which are hereby incorporated herein by reference:

U.S. patent application Ser. No. 10/993,221 entitled "PARASITIC SYNCHRONIZATION FOR A CENTRALIZED TDMA BASED COMMUNICATIONS GUARDIAN") and which is also referred to here as the '5281 Application;

U.S. patent application Ser. No. 10/993,164 entitled "PORT DRIVEN AUTHENTICATION IN A NETWORK") and which is also referred to here as the '7587 Application; and U.S. patent application Ser. No. 10/993,911 entitled "ASYNCHRONOUS HUB") and which is also referred to here as the '5031 Application.

TECHNICAL FIELD

The following description relates to the field of electronics and in particular, to priority based arbitration for TDMA based communication protocols.

BACKGROUND

Distributed, fault-tolerant communication systems are used, for example, in applications where a failure could possibly result in injury or death to one or more persons. Such applications are referred to here as "safety-critical applications." One example of a safety-critical application is in a system that is used to monitor and manage sensors and actuators included in the fields of automotive, aerospace electronics, industrial control, and the like.

Architectures considered for safety-critical applications are commonly time-triggered architectures where nodes use the synchronized time to coordinate access to common resources, such as the communication bus. One architecture that is commonly considered for use in such safety-critical applications is the Time-Triggered Architecture (TTA). In a TTA system, multiple nodes communicate with one another over two replicated high-speed communication channels using, for example, a time-triggered protocol such as the Time-Triggered Protocol/C (TTP/C).

Fault-tolerant protocols (e.g. TTP/C) that use time-division multiple access (TDMA) as the medium access strategy where each node is permitted to periodically utilize the full transmission capacity of the bus for some fixed amount of time called a TDMA slot. As long as each node uses only its statically assigned TDMA slot, collision free access the bus can be assured.

Typically, transmissions of messages by nodes in a TTP network are controlled by a schedule table which determines which node has permission to transmit for each TDMA slot, and also defines the starting time and duration of the TDMA slot. This starting time and duration defines a node's permitted transmission window. A node's transmitter starts to send its message after the start of its window, and should finish before it is over. Nodes without permission to transmit listen for transmissions when a TDMA slot begins until the duration has elapsed. The timing of when a node transmits and receives is controlled by a node's local clock that is synchronized to other nodes in the system, by a distributed clock synchronization algorithm. In practice, the perfect synchronization of all of the nodes' clocks is not possible so that the clocks for each node are slightly skewed from each other. Because of this, it is possible that a node's transmitter may begin to transmit a message before one or more of the receiving nodes are ready to listen. Similarly, it is possible for a node to continue transmission after the other nodes have stopped listening. Additionally, a degraded node may attempt to transmit well outside of its assigned window.

A centralized guardian has been conceived to limit the propagation of such failures. These Guardians (or central guardians) ensure that a degraded node transmitter cannot broadcast to the network outside its allotted window. At the beginning of a TDMA slot, after a predefined delay, the guardian opens a window which allows a node to transmit messages to the network. If the node is operating correctly, it will begin transmission shortly after the guardian's window opens and complete transmission before the window closes. Ideally, receiving nodes (i.e. listening nodes) begin listening at the beginning of the TDMA slot until the guardian's window closes. The guardian blocks transmissions from a node that does not occur within the transmission window.

One problem with the current state of the art for guardians is that realizations of guardian functions have been required to duplicate the protocol logic engine implemented at the nodes in order to have independent knowledge of the communication schedule and timing parameters, such as slot order, transmission start time, etc. Implementation of the protocol logic engine within the guardian has led to highly complex guardian designs. With the centralization of the guardian's roll in regards to network data flow, guardians themselves have become critical architecture components. The complexity of a guardian design is a significant issue with respect to the viability of a design in safety critical applications. For example, in some cases gate level failure analysis is required before a guardian design may be used for safety critical applications. In these cases, the complexity of performing a failure analysis for such a guardian has significant financial impact in terms of product development costs. In some applications guardian circuitry may be required to perform self-tests to ascertain its own health. The complexity of these self-tests is also directly related to the complexity of the guardian.

Another problem is that for some protocols, current guardian designs based on internally implementing protocol logic engines requires that guardian within a network be coupled together. Embodiments of the present invention eliminate this requirement.

It has further introduced the possibility of failure in the form of inconsistency between the guardian and the nodes it is protecting. Requiring the guardian to maintain knowledge of current or past states, in the form of transmission orders, leaves the implementation vulnerable to state upsets, which can be induced by environmental factors such as high energy neutrons.

For the reasons stated above and for other reasons stated below which will become apparent to those skilled in the art upon reading and understanding the specification, there is a need in the art for a simplified guardian design.

SUMMARY

Embodiments of the present invention enable a simple priority based arbitration mechanism to be realized in a central guardian of a TDMA based protocol communication network. In place of realizing a full protocol engine with schedule knowledge within a guardian, embodiments of the present invention enable a central guardian to arbitrate between the system's member nodes attempting to communicate on the network simultaneously.

In one embodiment, a multi-channel network having priority based arbitration is provided. The network comprises a plurality of nodes, wherein each node is adapted to transmit and receive data and two or more hubs, each hub having communication links with the plurality of nodes. Each node is adapted to communicate with every other node through the one or more hubs and the communication links between any one hub and the plurality of nodes defines a first channel. The network further comprises two or more guardians, wherein each guardian is associated with one hub and each node is adapted to transmit through the channel during a time slot. For each channel of the multi-channel network, each node is assigned a unique priority rank such that no two nodes on one channel have the same assigned priority rank. For each channel, the priority ranks for each of the plurality of nodes are in different directions. A first guardian of the two or more guardians for an associated hub determines which node is permitted to transmit during a time slot by permitting only a winning node with the highest assigned priority rank to transmit through the channel.

In another embodiment, a network is provided. The network comprises a plurality of sub-networks and a plurality of nodes adapted to transmit and received data. Through each sub-network, every node is coupled to communicate data with every other node. For each sub-network, each node is assigned a unique priority rank. A winning node of the plurality of nodes is identified as having the highest priority rank for at least one sub-network and is permitted to transmit data during a time slot. For each channel the nodes are ranked in a different priority direction.

In yet another embodiment, a method for priority based arbitration for a central guardian of one channel of a TDMA multi-channel network is provided. The method comprises assigning a unique priority rank to each node coupled to the one channel, observing the receipt of a first preamble signal indicating the intention of a first node of the plurality of nodes to transmit during the time slot, and observing the receipt of a second preamble signal indicating the intention of a second node of the plurality of nodes to transmit during the time slot within a predefined time interval of observing the receipt of the first preamble signal. When the first node has a higher priority rank than the second node, the method further comprises allowing only the first node to transmit through the one channel during the time slot. When the second node has a higher priority rank than the first node, the method further comprises allowing only the second node to transmit through the one channel during the time slot. For each channel of the multi-channel network, the unique priority rank direction is different.

In yet another embodiment, a multi-channel network is provided. The network includes a means for priority based arbitration for a centralized guardian with a plurality of nodes. The network further includes means for assigning a unique priority rank to each node of a plurality of nodes coupled to a first channel of the multi-channel network, a means for observing the receipt of a first preamble signal indicating the intention of a first node of the plurality of nodes to transmit during a time slot and a means for observing the receipt of a second preamble signal indicating the intention of a second node of the plurality of nodes to transmit during the time slot within a predefined time interval of observing the receipt of the first preamble signal. The network further comprises a means for allowing only the first node to transmit during the time slot, when the first node has a higher priority rank than the second node; and a means for allowing only the second node to transmit during the time slot when the second node has a higher priority rank than the first node. For each channel of the multi-channel network, the unique priority rank direction is different.

In yet another embodiment a computer-readable medium having computer-executable instructions for performing a method of priority based arbitration for a central guardian of one channel of a TDMA multi-channel network is provided. The method comprises assigning a unique priority rank to each node of a plurality of nodes coupled to the one channel, observing the receipt of a first preamble signal indicating the intention of a first node of the plurality of nodes to transmit during a time slot, and observing the receipt of a second preamble signal indicating the intention of a second node of the plurality of nodes to transmit during the time slot within a predefined time interval of observing the receipt of the first preamble signal. When the first node has a higher priority rank than the second node, the method further comprises allowing only the first node to transmit through the one channel during the time slot; and when the second node has a higher priority rank than the first node, the method further comprises allowing only the second node to transmit through the one channel during the time slot. For each channel of the multi-channel network, the unique priority rank direction is different.

BRIEF DESCRIPTION OF THE DRAWINGS

The present invention can be more easily understood and further advantages and uses thereof more readily apparent, when considered in view of the description of the preferred embodiments and the following figures in which.

Figure 1:
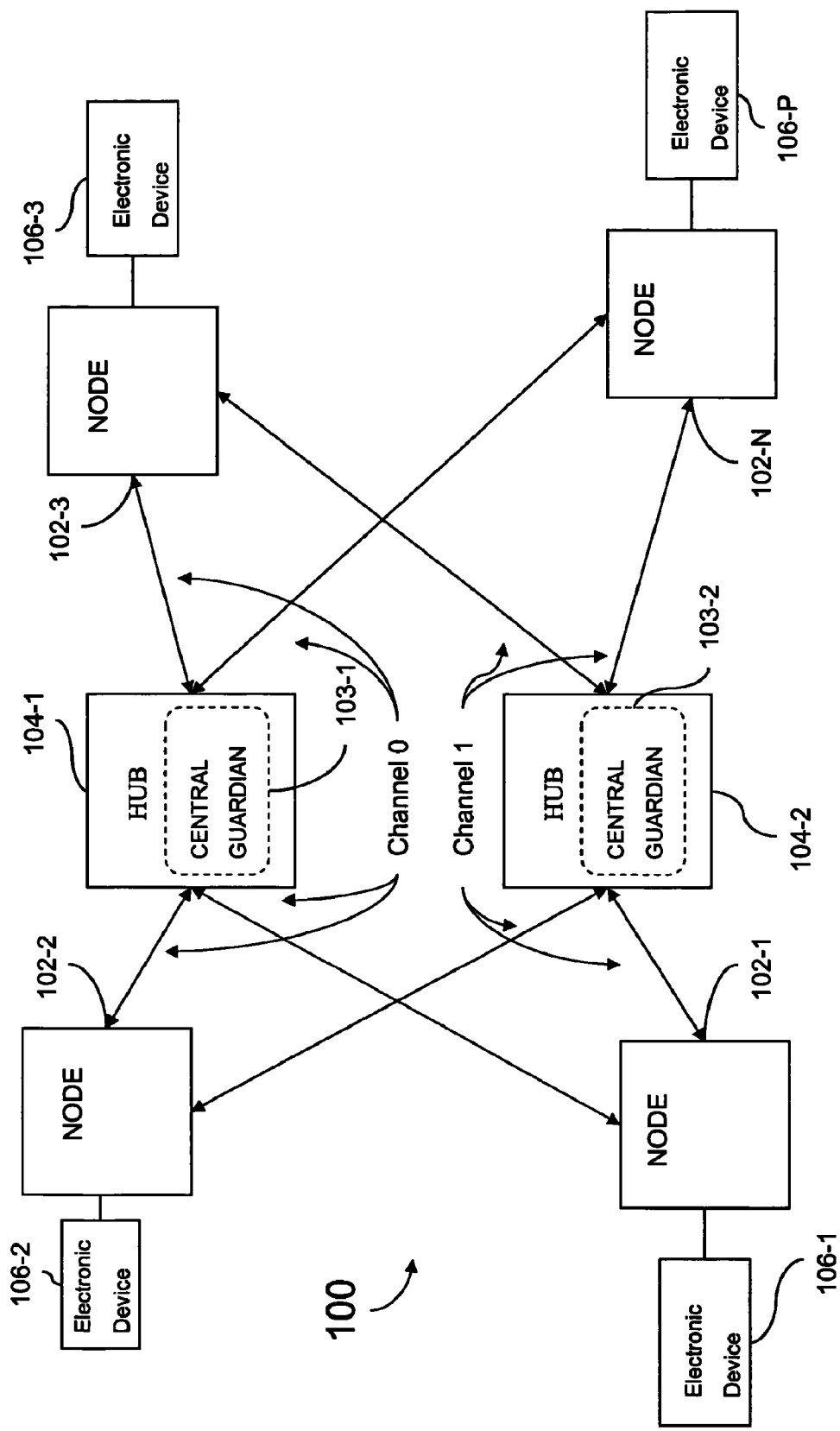
FIG. 1 is a block diagram of a dual-channel network of one embodiment of the present invention.

In accordance with common practice, the various described features are not drawn to scale but are drawn to

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention enable a simple priority based arbitration mechanism to be realized in a central guardian of a TDMA based protocol communication network. In place of a full protocol engine within the guardian, embodiments of the present invention enable a central guardian to arbitrate access to the communications channel between member nodes, each of which already implement full protocol engines themselves. Embodiments of the present invention do not require the central guardian to know the underlying protocol in regards to which node is permitted to transmit during which TDMA slot. However, for single failure tolerant network designs, the availability of network communications achieved using the present invention is equivalent to that of guardians executing full protocol enforcement. Requiring no specific knowledge of protocol behavior, the present invention enables very simple synchronization logic to be realized.

This invention differs from previous systems, as it prevents data collisions caused by two nodes transmitting on a channel simultaneously, without duplicating the protocol logic engine of the nodes within the guardian. This has advantages over the current practice including much less complex implementations and simplified guardian failure analysis for safety critical domains, and removes guardian dependency on protocol state logic and signals.

The invention presented exploits the fact that in many networks channels are often duplicated to ensure the continued availability of data communications and fault tolerance. Utilizing the nature of multi-channel networks, it is possible to soften the requirements for guardian enforcement decisions relative to current state of the art guardians. Instead of guaranteeing that only the correct node will be allowed transmit data on a channel during a TDMA slot, embodiments of the present invention guarantee that 1) only one node will be allowed to transmit data over a given channel, and 2) the correct node (i.e. the node that according to protocol is permitted to transmit during a TDMA slot) has exclusive access to at least one channel in order to transmit its data. Because the purpose of duplicated channels in these applications is for availability assurance only, such a philosophy is consistent with the underlying assumptions of such protocols. Using such a design rationale, the implementation of a centralized guardian can be realized based on a simple priority based arbitration circuit.

FIG. 1 is a block diagram of one embodiment of multi-channel network, shown generally at 100, according to the teachings of the present invention. Although FIG. 1 illustrates a dual channel network for simplicity, it would be readily understood by one skilled in the art upon reading this specification that embodiments of the present invention also readily apply to networks with greater than two channels. Network 100 includes a plurality of nodes 102-1 to 102-N. In this embodiment, network 100 includes a plurality of nodes 102-1 to 102-N each coupled to hubs 104-1 and 104-2. In one embodiment, data is transmitted in frames from one node 102-1 to 102-N to another in network 100 through hubs 104-1 and 104-2. In one embodiment, each sub-network comprising communication links between an individual hub and the plurality of nodes 102-1 to 102-N defines a single network channel. In one embodiment, network 100 operates as a dual channel system where hub 104-1 operates to distribute data communications on the "0" Channel between nodes 102-1 to 102-N and hub 104-2 operates to distribute data communications on the "1" Channel between nodes 102-1 to 102-N. In one embodiment, one or more electronic devices 106-1 to 106-P are connected to nodes 102-1 to 102-N. In one embodiment, electronic devices 106-1 to 106-P include sensors, processors, actuators, controllers, input devices and the like that communicate data frames over network 100.

Network 100 operates on a time division multiple access (TDMA) based communication protocol where each node 102-1 to 102-N is assigned a transmission TDMA slot order. In such a network each node independently implements the protocol and has full knowledge of the current protocol state (i.e. each node independently knows the state of which TDMA slot is the current TDMA slot, the time the current TDMA slot's transmission window will open, the time the current TDMA slot's transmission window will close, whether the node has permission to transmit during the current TDMA slot's transmission window, as well as which TDMA slot is the next TDMA slot and future TDMA slots.)

Hubs 104-1 and 104-2 each include a central guardian 103-1 and 103-2 that functions to regulate the propagation of data communications from nodes 102-1 to 102-N through each associated channel. In order to reduce the complexity of the guardian 103-1 and 103-2 function the present invention provides a simple priority based arbitration protocol.

Priority based arbitration for network 100 is achieved as follows: In one embodiment, in operation, each node 102-1 to 102-N is designated a first priority scheme on Channel 0 and a second priority scheme on Channel 1. For example, in one embodiment nodes 102-1 to 102-N have an increasing associated priority of 1 through N on Channel 0. On Channel 1, the priority is reversed so that nodes 102-1 to 102-N have a decreasing associated priority of N through 1. For each associated channel, guardians 103-1 and 103-2 only allow propagation of data through hub 104-1 and 104-2 transmitted by the highest priority node attempting to transmit during a time slot. Ideally, each node 102-1 to 102-N has full accurate knowledge of whether it is permitted to transmit during the current TDMA slot and only one node 102-1 to 102-N will attempt to transmit data over the channel during any single TDMA slot. Under these conditions, the guardian 103-1 and 103-2 plays a passive role because no arbitration over channel transmission rights is required. However, under a single failure scenario, a degraded node of nodes 102-1 to 102-N may attempt unauthorized transmissions during a TDMA slot assigned to another node 102-1 to 102-N. Under a priority scheme of one embodiment of the present invention, if node 102-1 (for example) attempts to transmit during 102-3's time slot, node 102-1 (with a priority of 1 on Channel 0) has priority over node 102-3 (which has a priority of 3 on Channel 0). Accordingly guardian 103-1 selects node 102-1 as the "winning" node for this arbitration contest. Guardian 103-1 denies node 102-3 access to transmit data over Channel 0 (even though node 102-3 is authorized by protocol to transmit) because it always looses priority arbitration battles with node 102-1 on this channel. However on Channel 1, node 102-3 always wins priority arbitration battles with node 102-1. Therefore, guardian 103-2 denies node 102-1 access to transmit data over Channel 1 and allows access to node 102-3. As a result, node 102-3 will always be able to transmit data across at least one channel during its assigned TDMA slot.

Under a single fault assumption with a network of at least two channels having different priority directions, embodiments of the present invention guarantee that a good transmission will get through on at least one channel (i.e. a node properly transmitting during its assigned TDMA slot will be selected as a winning node on at least one channel.) In one embodiment, each TDMA slot is arbitrated without any history, using only the information sensed during a particular arbitration period. In other embodiments, a guardian for a channel may incorporate historical information into the arbitration decision to try to determine which of multiple competing nodes is the correct node to allow to transmit over the channel (e.g. use history to eliminate certain nodes as contenders based on history of which nodes have recently transmitted.)

Figure 2:
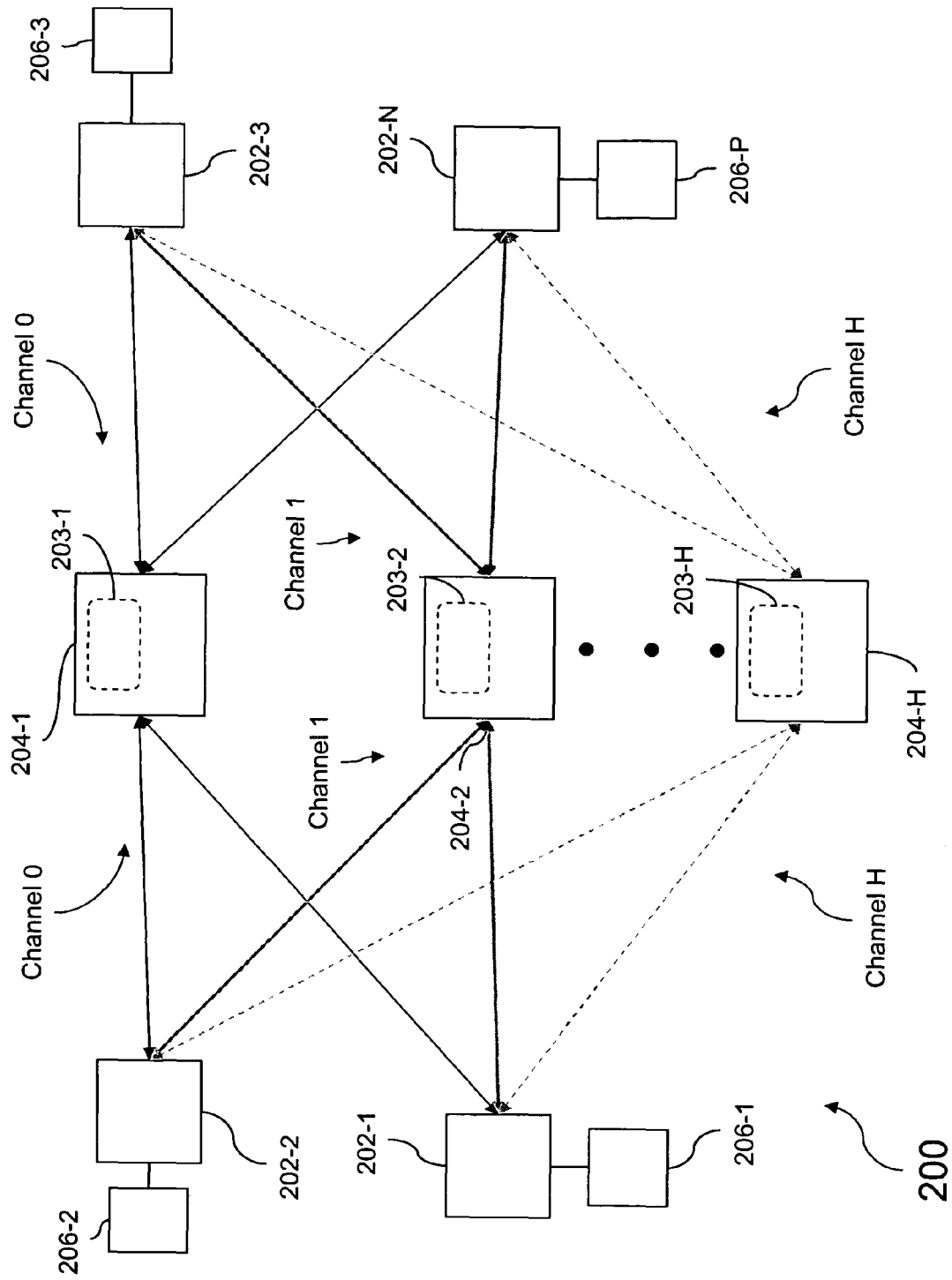
FIG. 2 is a block diagram of a multi-channel network of one embodiment of the present invention.

FIG. 2 is a block diagram of one embodiment of a multiple hub based network, shown generally at 200, according to the teachings of the present invention. In this embodiment, network 200 includes a plurality of nodes 202-1 to 202-N each coupled to a plurality of hubs 204-1 to 204-H. In one embodiment, each sub-network comprising communication links between an individual hub and the plurality of nodes 202-1 to 202-N defines a single network channel. Priority based arbitration in network 200 operates on the same basis as the dual hub network 100 described in the embodiments of FIG. 1.

Data is transmitted in frames from one node 202-1 to 202-N to another in network 200 through hubs 204-1 to 204-H. As described in for network 100 of FIG. 1, in one embodiment, network 200 operates on a time division multiple access (TDMA) based communication protocol where each node 202-1 to 202-N has been assigned a transmission slot order (i.e. a TDMA slot) within the channel. In one embodiment, the network is a TTP network and the TDMA slot is an SRU slot. Hubs 204-1 to 204-H each includes a central guardian 203-1 to 203-H that implements priority based arbitration of the present invention wherein guardian 203-1 to 203-H have different priority direction for the nodes 202-1 to 202-N. In one embodiment, under a single fault assumption, embodiments of the present invention guarantee that a good node transmission will get through on at least one channel of network 200, as long as at least one channel has a guardian utilizing a different priority direction than the other channels. In another embodiment, the guardians 203-1 to 203-H each employ different priority schemes for the nodes 202-1 to 202-N. In one embodiment, guardians 203-1 to 203-H are adapted with a memory that holds the priority schemes in a table. In one embodiment, the memory of guardians 203-1 to 203-H can be reprogrammed with different priority schemes. In another embodiment, the priority of nodes 201-1 to 201-N is determined by which port on hubs 201-1 to 201-H each node is wired to.

Figure 3:
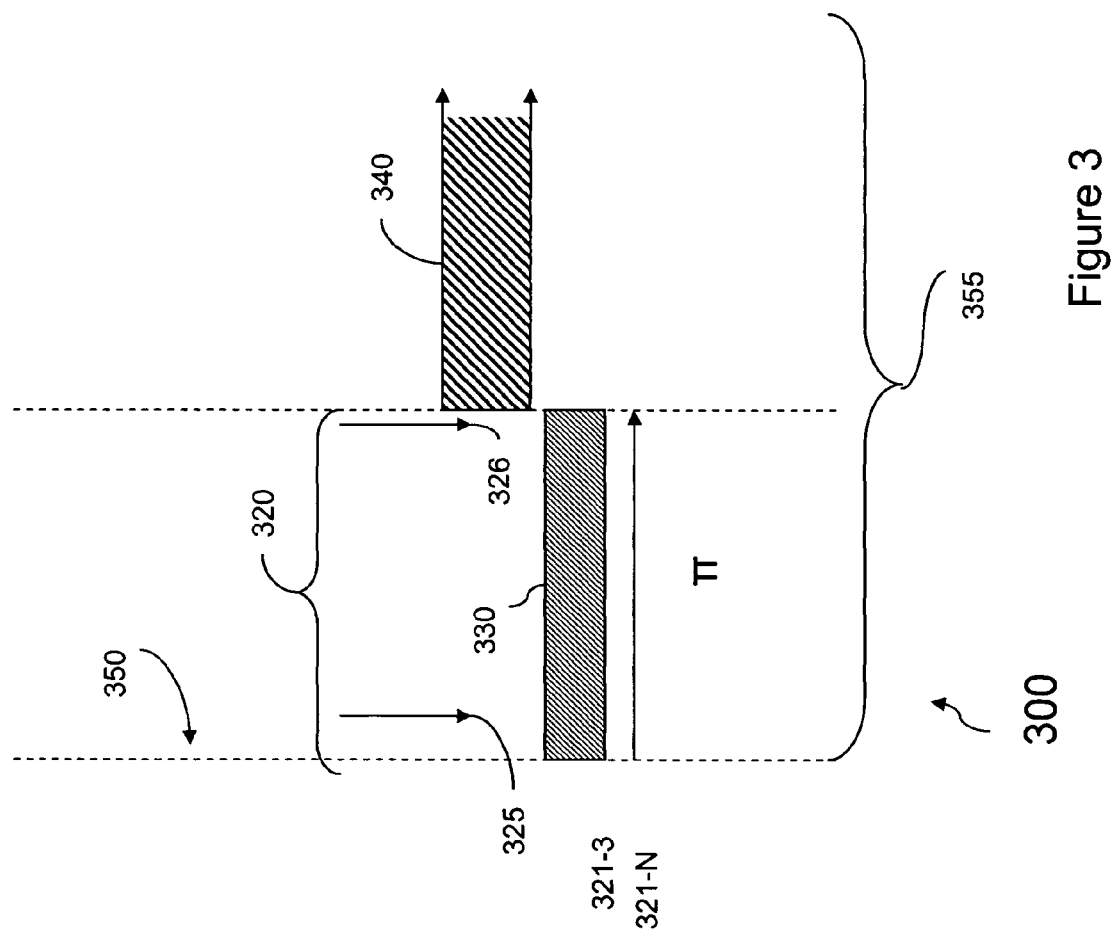
FIG. 3 is an arbitration timing diagram of one embodiment of the present invention.

FIG. 3 is an illustration of one embodiment of a priority based arbitration timing diagram for a network such as network 200 described with respect to FIG. 2. FIG. 3 includes one or more preamble signals 320 received from the nodes 202-1 to 202-N by a guardian 203 of one channel of network 200. A preamble signal received from a node indicates that the node sending the preamble signal intends to transmit data during the current TDMA slot 355. In one embodiment, nodes 202-1 to 202-N send preamble signals 320 to guardian 203 on the same communications link (such as communications link 210) utilized to transmit and receive data communications. In one embodiment, nodes 202-1 to 202-N send preamble signals to guardian 320 separate communications links (not shown) than those utilized to transmit and receive data communications.

At the start of the current TDMA slot 350, guardian 203 opens an arbitration window 330 of time π in duration. The bounded time interval π represents the maximum skew in the timing synchronization of nodes 202-1 to 202-N that properly operating nodes 202-1 to 202-N are expected to have. In some embodiments, arbitration window 330 has a duration time of π plus a signal propagation delay constant. Guardian 203 waits for a first preamble signal 325. If only one preamble signal is received during an arbitration window 330, then no arbitration between nodes is required and guardian 203 will close arbitration window 330 and open a transmission window 340 for the node which sent the one preamble signal. This will allow that node to transmit data to other nodes on the channel. In one embodiment, transmission windows 340 opens after a predefined time delay after arbitration windows 330 closes. Since each node 202-1 to 202-N knows that it is assigned (by protocol) a TDMA slot in which it is exclusively permitted to transmit, in a properly operating network, only a single preamble signal 325 is received by guardian 203 during arbitration window 330. Under a single fault assumption however, a faulty node may attempt to transmit during another node's TDMA slot. In that case, guardian 203 will receive two preamble signals (325 and 326) from two different nodes during arbitration window 330. Guardian 203 chooses which of the two nodes it will allow to transmit across the channel during TDMA slot 350. In one embodiment, guardian 203 arbitrates between the two nodes and allows only the node with the highest priority assignment to transmit across the channel. To make this arbitration decision, guardian 203 does not require knowledge of which node should be allowed to transmit per the underlying protocol. Upon the start of the next TDMA slot, guardian 203 will open transmission window 340 for the node with the highest priority assignment.

In order to perform priority based arbitration, in one embodiment, guardians 203-1 to 203-H are synchronized with the time base of nodes 202-1 to 202-N in order to coordinate the opening and closing of transmission widows and so that guardians 203-1 to 203-H and nodes 202-1 to 202-N agree on the timing of TDMA slots. In one embodiment, the lengths of TDMA slots of different nodes is different and correspond to the portion of the overall bandwidth assigned to the individual member node; each TDMA slot allows a specific amount of data transmission. In one embodiment, for each channel in network 200, the associated guardian 203-1 to 203-H is synchronized with network 200 through beacons transmitted by nodes 202-1 to 202-N, as provided in the '5281 application previously referenced and incorporated herein by reference. In one embodiment, network 200 is a TTP network and beacons transmitted by nodes 202-1 to 202-N are action time signals. Further details concerning the synchronization of guardians 203-1 to 203-H with nodes 202-1 to 202-N are provided in the '5281 spplication herein incorporated by reference. In another embodiment, a guardian may open an arbitration window based on the arrival of a first preamble signal, instead of based on the beginning of a TDMA slot as indicated through beacons transmitted by nodes. In another embodiment, the arbitration window is closed on the receipt of a second preamble signal and the arbitration winner is decided immediately.

Figure 4:
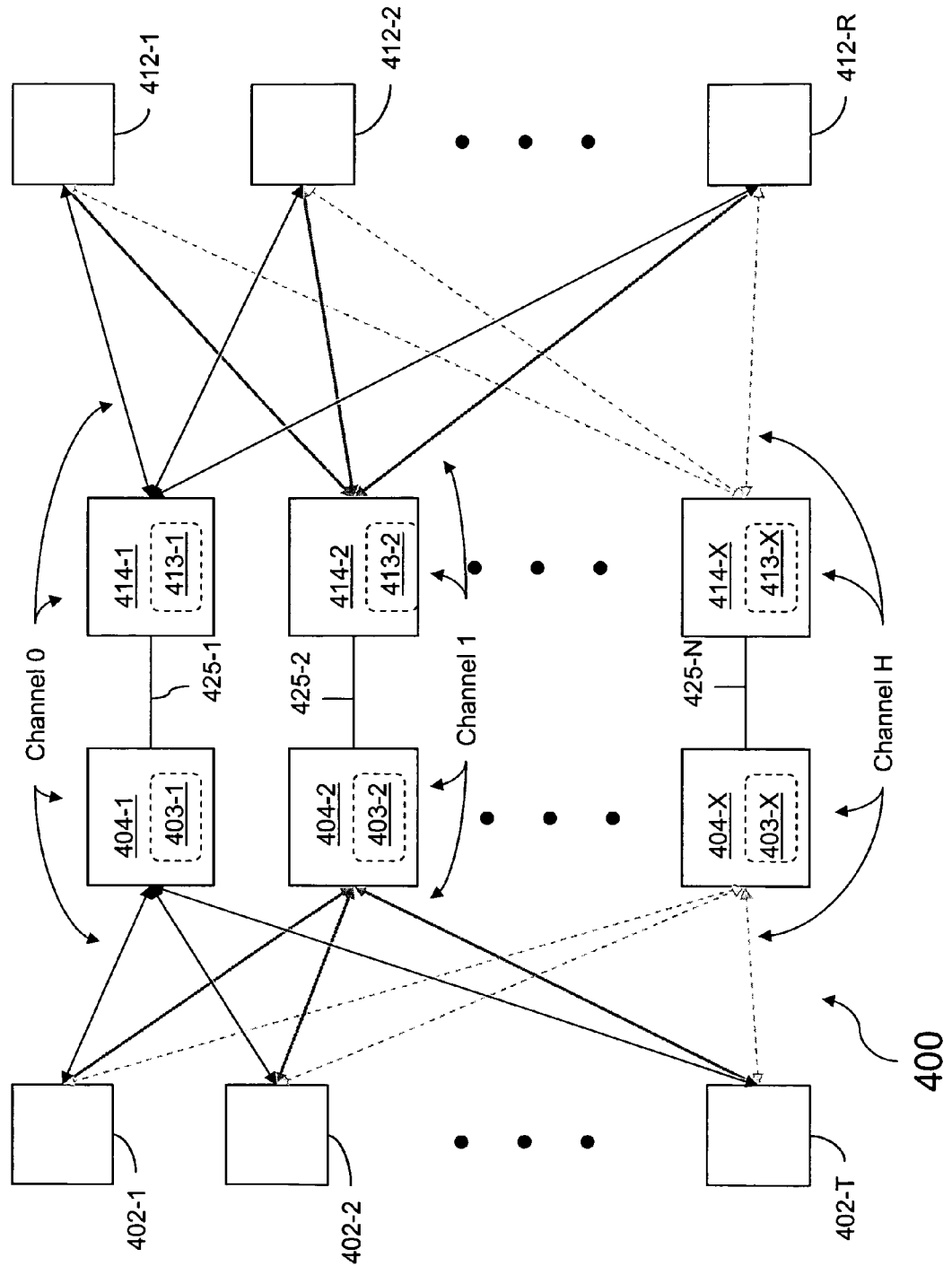
FIG. 4 is a block diagram of another multi-channel network of one embodiment of the present invention.

FIG. 4 is a block diagram of another embodiment of a multi-hub network, shown generally at 400, according to the teachings of the present invention. A plurality of hubs 404-1 to 404-X are each coupled to nodes 402-1 to 402-T. A plurality of hubs 414-1 to 414-X are each coupled to nodes 412-1 to 412-R. Each hub 404-1 to 404-X is coupled to one hub 414-1 to 414-X through an associated communications link 425-1 to 425-X to create linked hub pairs. The sub-network comprising each linked hub pair and the communications links coupling them to nodes 402-1 to 402-T and 412-1 to 412-R defines a single communications channel. Each node 402-1 to 402-T and 412-1 to 412-R can communicate with every other node 402-1 to 402-T and 412-1 to 412-R through the linked hubs. Hubs 404-1 to 404-X and 414-1 to 414-X each include a central guardian 403-1 to 403-X and 413-1 to 403-X that functions to regulate the propagation of data communications through each associated channel and across communication links 425-1 to 425-X using priority based arbitration.

Priority based arbitration for network 400 is achieved as follows: In one embodiment, in operation, each node 402-1 to 402-T and 412-1 to 412-R is assigned a priority based on a global priority scheme for each channel. For example, in one embodiment nodes 402-1 to 402-T and 412-1 to 412-R have an increasing associated global priority of 1 through T+R on Channel 0. On Channel 1, the priority is reversed so that nodes 402-1 to 402-T and 412-1 to 412-R have a decreasing associated priority of T+R through 1. Ideally, each node 402-1 to 402-T and 412-1 to 412-R has full accurate knowledge of whether it is permitted to transmit during the current TDMA slot and only one of nodes 402-1 to 402-T and 412-1 to 412-R will attempt to transmit data over the channel during any single TDMA slot. Under these conditions, the guardians 403-1 to 403-X and 413-1 to 413-X play a passive role because no arbitration over channel transmission rights is required. However, under a single failure scenario, a degraded node of 402-1 to 402-T and 412-1 to 412-R may attempt unauthorized transmissions during a TDMA slot assigned to another node of 402-1 to 402-T and 412-1 to 412-R. As described with respect to FIG. 2, priority based arbitration allows only the node with the highest priority to transmit over the channel. One consequence of the global priority scheme of the embodiment described above is that any node 402-1 to 402-T sending a preamble signal to hub 404-1 (indicating an intent to transmit over Channel 0) will have priority over any node 412-1 to 412-R indicating an intent to transmit to hub 414-1. Accordingly, any node 412-1 to 412-R sending a preamble signal to hub 414-2 (indicating an intent to transmit over Channel 1) will have priority over any node 402-1 to 402-T indicating an intent to transmit to hub 404-2.

On Channel 0 when guardian 403-1 either 1) receives a preamble signal from a single node 402-1 to 402-T, or 2) arbitrates a wining node (i.e. a node with the highest priority) after two nodes of 402-1 to 402-T send a preamble signal, then hub 404-1 allows that node to transmit data to hub 414-1 over communications link 425-1. Consequently, guardian 413-1 blocks any of nodes 412-1 to 412-R from transmitting over Channel 0 because all of hub 414-1's nodes are lower in priority than any of hub 404-1's nodes. In contrast, when guardian 413-1 either 1) receives a preamble signal from a single node 412-1 to 412-R, or 2) arbitrates a wining node after two nodes of 412-1 to 412-R send a preamble signal, then hub 414-1 allows that node to transmit data to hub 404-1 over communications link 425-1 only if guardian 403-1 has not received a preamble from any of nodes 402-1 to 402-T. If guardian 403-1 has not received a preamble signal from a higher priority node, then guardian 403-1 blocks any of nodes 402-1 to 402-R from transmitting over Channel 0 during the time slot.

Because the global priority scheme for Channel 1 is opposite in direction from Channel 0, on Channel 1 when guardian 413-2 either 1) receives a preamble signal from a single node 412-1 to 412-R, or 2) arbitrates a wining node (i.e. a node with the highest priority) after two nodes of 412-1 to 412-R send a preamble signal, then hub 414-2 allows that node to transmit data to hub 404-2 over communications link 425-2. Consequently, guardian 403-2 blocks any of nodes 402-2 to 402-T from transmitting over Channel 1 because all of hub 404-2's nodes are lower in priority than any of hub 414-2's nodes. In contrast, when guardian 403-2 either 1) receives a preamble signal from a single node 402-1 to 402-T, or 2) arbitrates a wining node after two nodes of 402-1 to 402-T send a preamble signal, then hub 404-2 allows that node to transmit data to hub 414-2 over communications link 425-2 only if guardian 403-1 has not received a preamble from any of nodes 402-1 to 402-T. If guardian 413-2 has not received a preamble signal from a higher priority node, then guardian 413-2 blocks any of nodes 412-1 to 412-T from transmitting over Channel 1 during the time slot.

As previously discussed, under a single fault assumption with a network 400 of at least two channels having different priority directions, embodiments of the present invention guarantee that a node authorized to transmit by the underlying protocol will have a transmission get through on at least one channel.

Figure 5A:
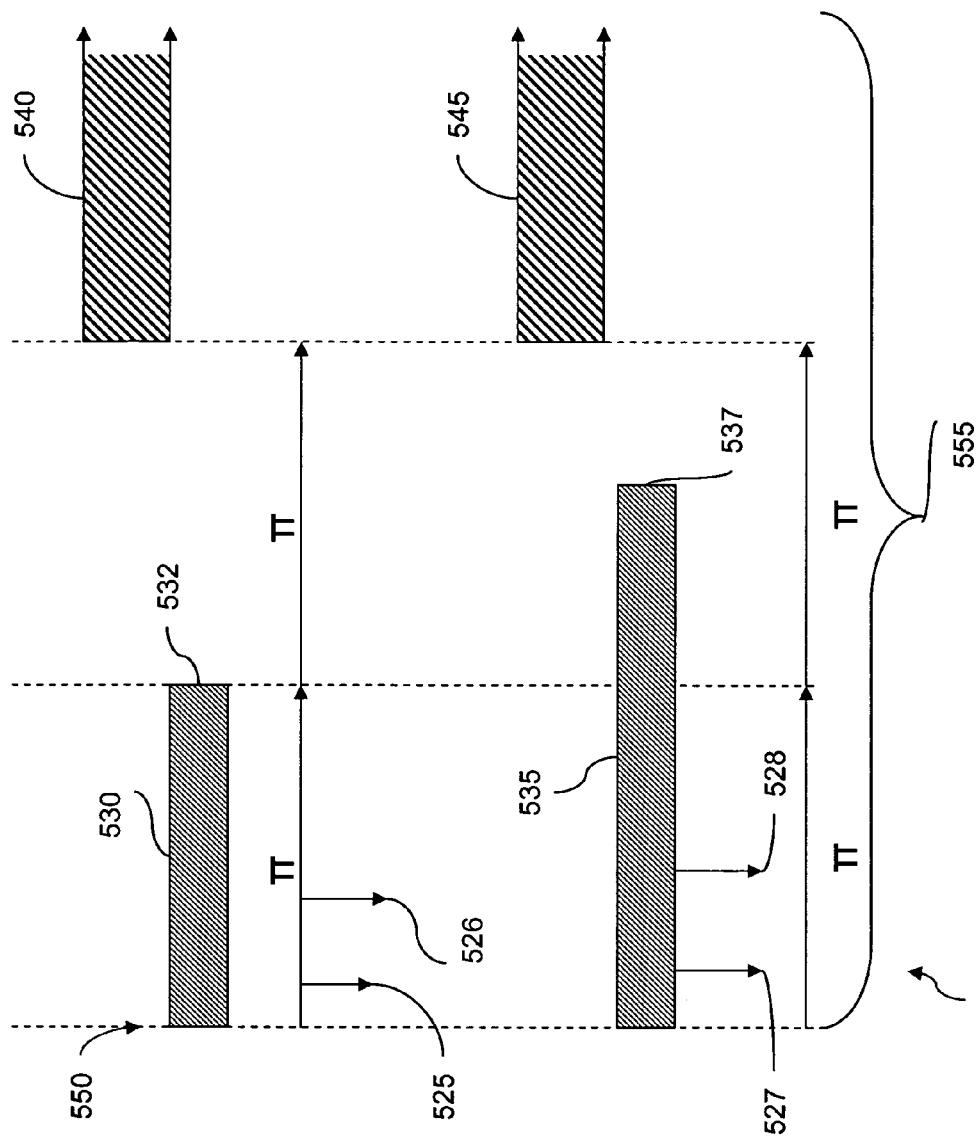
FIGS. 5a and 5b are arbitration timing diagrams of other embodiments of the present invention.
Figure 5B:
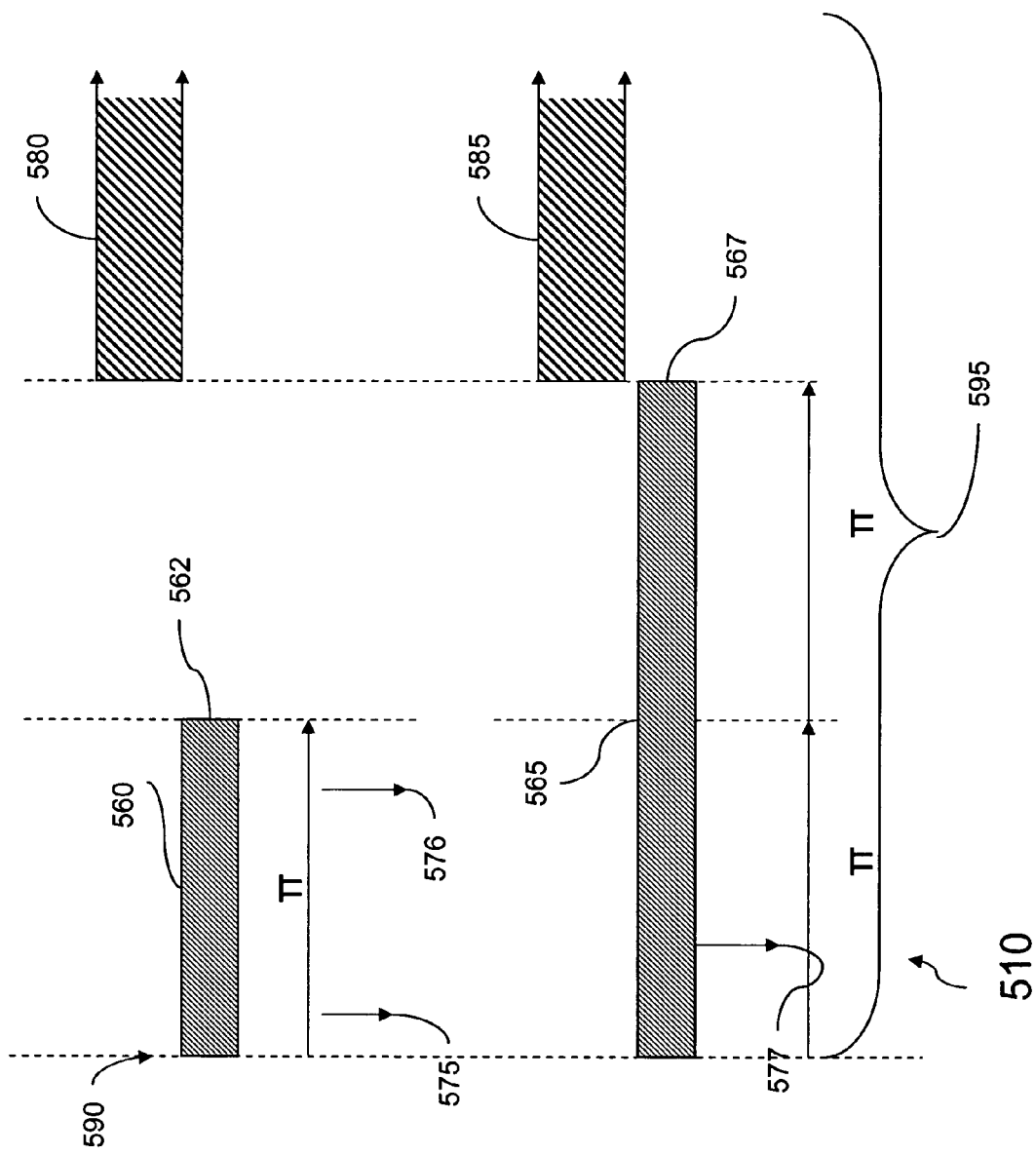

FIGS. 5a and 5b are illustrations of embodiments of priority based arbitration timing diagrams for Channel 0 of a network such as network 400 described with respect to FIG. 4 including the global priority scheme described for Channel 0 with respect to FIG. 4.

In one embodiment, communication links 425-1 to 425-N are full duplex communication links allowing communications in both directions between coupled hub pairs with priority based arbitration timing 500 as illustrated in FIG. 5a. Arbitration window 530 opens up for guardian 403-1 on the detection of the start of a TDMA slot (shown at 550). In one embodiment, arbitration time window 530 has a duration of $\pi$. The bounded time interval $\pi$ represents the maximum skew in the timing synchronization of nodes 402-1 to 402-T that properly operating nodes 402-1 to 402-T are expected to have. In some embodiments, arbitration window 530 has a duration time of $\pi$ plus a signal propagation delay constant. Guardian 403-1 arbitrates amongst any of nodes 402-1 to 402-T that send a preamble signal (such as preamble signals 525 and 526) during arbitration time window 530. If guardian 403-1 arbitrates a winning node, it allows that node to transmit data to transmit to hub 414-1 after arbitration time window 530 closes (shown at 532). Guardian 413-1 then blocks nodes 412-1 to 412-R from transmitting during TDMA slot 555 while guardian 403-1 opens a transmission window 540 for the winning node.

Arbitration window 535 opens up for guardian 413-1 on the detection of the start of a TDMA slot (shown at 550). Guardian 413-1 arbitrates amongst any nodes 412-1 to 412-R that send a preamble signal (such as preamble signals 527 and 528) during arbitration time window 535 in addition to any winning node resulting from the arbitration of nodes 402-1 to 402-T. If guardian 413-1 arbitrates a winning node from nodes 412-1 to 412-R, and does not receive any data transmission from guardian 403-1 during arbitration time window 535, then guardian 413-1 allows the winning node to transmit data to hub 404-1 after arbitration time window 535 closes (shown at 537). Guardian 403-1 then blocks nodes 402-1 to 402-T from transmitting during the TDMA slot while guardian 413-1 opens transmission window 545 for the winning node. Arbitration window 535 must be longer in duration than arbitration window 530 because guardian 403-1 cannot make an arbitration decision until arbitration window 530 closes, and guardian 413-1 must allow guardian 403-1 sufficient time to make and communicate an arbitration decision before it makes its own arbitration decision. In one embodiment, arbitration window 535 has a duration of 2π.

If guardian 403-1 does arbitrate a winning node, then guardian 403-1 will open transmission window 540 to allow the node to transmit to the other nodes of the channel via hub 404-1, 414-1 and communications link 425-1. Meanwhile, guardian 413-1 blocks nodes 412-1 to 412-R from transmitting on the channel. If guardian 403-1 does not arbitrate a winning node, then after arbitration window 530 closes, guardian 413-1 knows it is safe to open transmission window 545 for one node 412-1 to 412-R with the highest priority and allow that node to transmit via communication link 225-1 to nodes 402-1 to 402-T.

To make these arbitration decisions, guardians 403-1 and 413-1 do not require knowledge of which node should be allowed to transmit per the underlying protocol. In one embodiment, priority based arbitration timing for Channel 1 of network 400 operates the same as described in FIG. 5 except that the global priority is reversed so that nodes 402-1 to 402-T and 412-1 to 412-R have a decreasing associated priority of T+R through 1. In that case guardian 403-2 must listen for preamble signals from nodes 402-1 to 402-T and from hub 414-2, so that guardian 403-2 must maintain its own arbitration window open for a longer duration to allow for the propagation of an arbitration decision from guardian 413-2. Embodiments of the present invention guarantee that a node transmission will get through on at least one channel of network 400, as long each channel has guardian pairs utilizing a different global priority direction than the other channels.

In one embodiment, communication links 425-1 to 425-N are half-duplex communication links (allowing communications in only one direction at a time between coupled hub pairs) with priority based arbitration timing 510 as illustrated in FIG. 5b. In one embodiment, link 425-1 is half-duplex with a default configuration that allows communications only from 404-1 (the high priority hub) to 404-1 (the low priority hub). Because communication link 425-1 is half-duplex, guardian 403-1 must arbitrate blindly with respect to guardian 413-1. Arbitration window 560 opens up for guardian 403-1 on the detection of the start of a TDMA slot (shown at 590). Guardian 403-1 arbitrates amongst any nodes 402-1 to 402-T that send a preamble signal (such as preamble signals 575 and 576) during arbitration time window 560 of duration π. If guardian 403-1 arbitrates a winning node, it allows the winning node to transmit to hub 414-1 after arbitration time window 560 closes (shown at 562). In the meantime, arbitration window 565 opens up for guardian 413-1 on the detection of the start of the TDMA slot (shown at 590). Guardian 413-1 arbitrates amongst any nodes 412-1 to 412-R that send a preamble signal (such as preamble signals 577 and 578) during arbitration time window 565 in addition to notifications from hub 404-1 of any winning node resulting from the arbitration of nodes 402-1 to 402-T. Arbitration window 565 must be longer in duration than arbitration window 560 because guardian 403-1 cannot make an arbitration decision until arbitration window 560 closes, and guardian 414-1 must allow guardian 403-1 sufficient time to make and communicate an arbitration decision before it makes its own arbitration decision. In one embodiment, arbitration window 565 has a duration of 2π. If guardian 403-1 does arbitrate a winning node, then guardian 403-1 will open transmission window 580 to allow the node to transmit to the other nodes of the channel via hub 404-1, 414-1 and communications link 425-1 during TDMA slot 595. Meanwhile, guardian 413-1 blocks nodes 412-1 to 412-R from transmitting on the channel. If guardian 403-1 does not arbitrate a winning node, then after arbitration window 565 closes guardian 403-1 declares hub 414-1 to be the default winner. Then guardian 413-1 knows it is safe to open transmission window 585 for node 412-1 to 412 R with the highest priority and allow that node to transmit via communication link 225-1 to nodes 402-1 to 402-T during TDMA slot 595.

Figure 6:
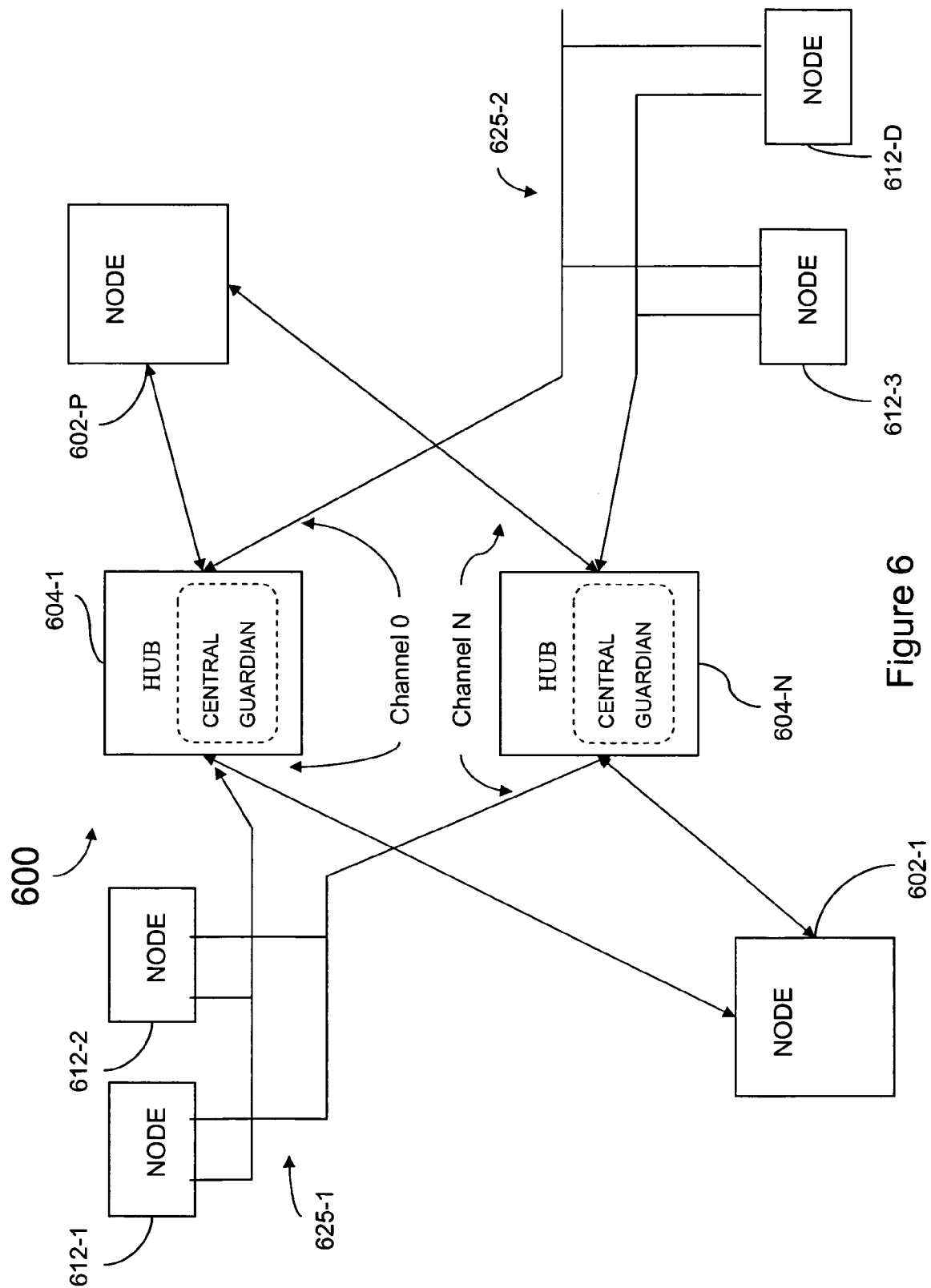
FIG. 6 is a block diagram of another multi-channel network of one embodiment of the present invention.

FIG. 6 is a block diagram of an alternate embodiment of a network, shown generally at 600, according to the teachings of the present invention. Node 600 includes hub and bus configurations. Hubs 604-1 to 604-N are each coupled directly to nodes 602-1 to 602-P. Nodes 612-1 to 612-D are each coupled to buses 625-1 and 625-2. Buses 625-1 and 625-2 are coupled to each of hubs 604-1 and 604-2. In operation each nodes 602-1 to 602-P and 612-1 to 612-D sends one frame on each of the N channels during every TDMA round. In one embodiment, the priority arbitration schemes provided throughout this application are applicable to arbitrating between the nodes 602-1 and 602-P (i.e. nodes coupled directly with hubs 604-1 to 604-N) and N channel busses 625-1 and 625-2 where each bus is treated as a single node for priority arbitration purposes.

Figure 7:
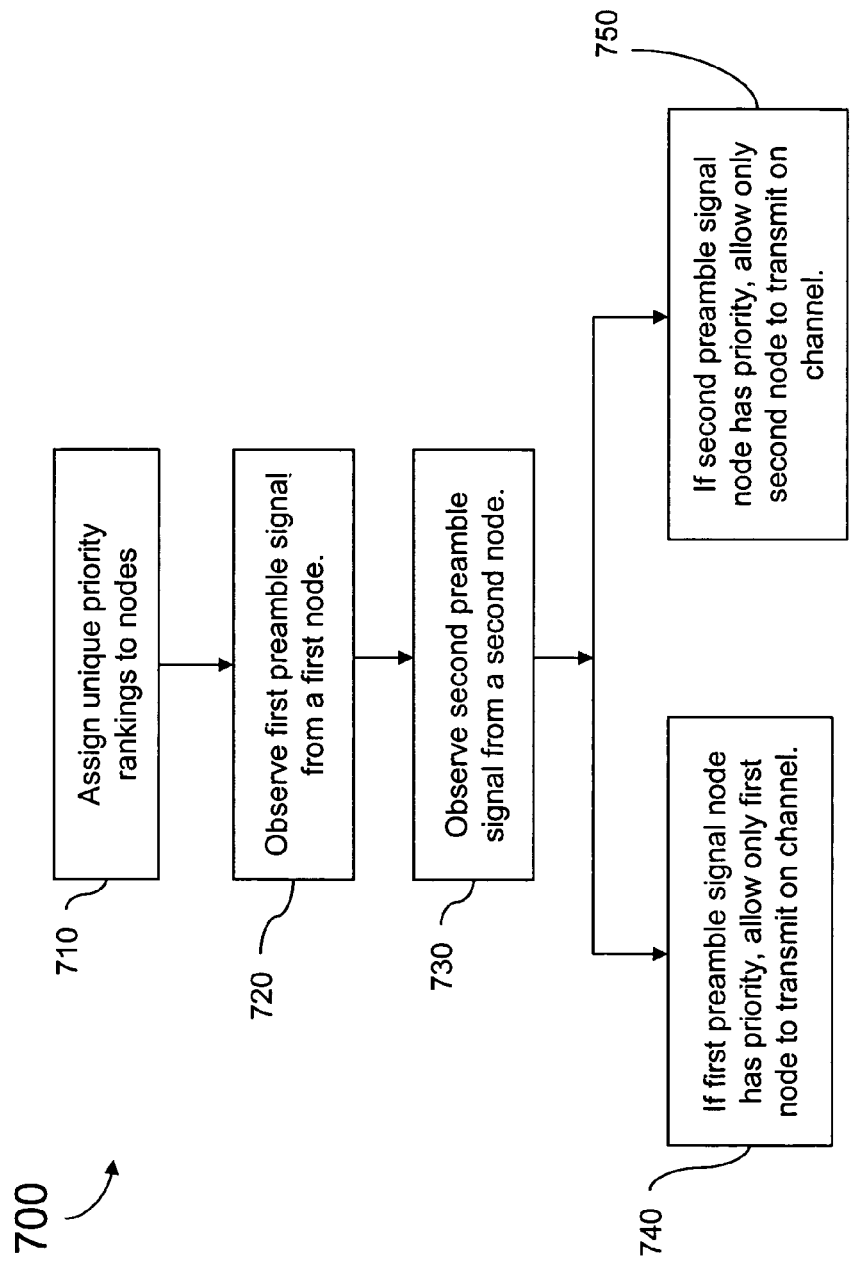
FIG. 7 is a flow chart of a method of an embodiment of the present invention.

FIG. 7 is a flow chart of one of a method of priority based arbitration for a central guardian of one channel of a TDMA multi-channel network, shown generally at 700. The method initially comprises assigning a unique priority rank to each node coupled to the channel (710) wherein the unique priority rank direction for the nodes of the one channel is different than the unique priority rank direction of another channel of the multi-channel network. The method proceeds with observing the receipt of a first preamble signal (720) indicating the intention of a first node to transmit during the time slot and observing the receipt of a second preamble signal (730) indicating the intention of a second node to transmit during the time slot within a predefined time interval of observing the receipt of the first preamble signal. When the first node has a higher priority rank than the second node, the method continues with allowing only the first node to transmit through the one channel during the time slot (740). When the second node has a higher priority rank than the first node, the method continues with allowing only the second node to transmit through the one channel during the time slot (750).

By removing the requirement to store schedule information in the Hub the following advantages are achieved:
  a. Removal of the tool issues relating to Central Guardian Schedule Table development and verification of Central Guardian Schedule correctness.
  b. Reduction in complexity of a central guardian relieving it from the need to store and utilize Central Guardian Schedule Table information.
  c. Reduction in hub-state space and susceptibility to single event upset (SEU). In one embodiment, single event upset is based on upsets induced by high energy neutrons. Embodiments of the present invention reduce SEU by having no required schedule position related state for a guardian to keep track of. Therefore, there is no state to be upset.
  d. Removal of Guardian's semantic dependency on protocol state signals
      Enabling of the Central Guardian to enforce across TDMA Protocol Mode changes that result in different transmission order, without the hub processing mode change signals.
      Enabling of Multiplexed Nodes to shared TDMA Slots, without the hub following schedule position.

In one embodiment, simple heuristics is added to further enhance the resilience of the guardian in the above described systems. In one embodiment, if a node is showing activity prior to its time slot, it could be disabled from taking part in the arbitration. This effectively contains a node sending errant preamble signals or any node that is not synchronized to the network. In another embodiment once a node has won arbitration it may be blocked and prevented from arbitrating for 1 or more slots.

In one embodiment a centralized guardian of the present invention is further adapted to modify messages transmitted through the associated hub with an identifier derived from the port number the originating node is coupled to, as detailed in the '7587 application herein incorporated by reference. Accordingly, a node simultaneously receiving two different messages on diverse channels can identify the two nodes transmitting the messages and, in one embodiment, choose to accept only the message from the node authorized by protocol to transmit during the TDMA slot. Further details pertaining to port driven authentication in a network as described above can be found in the '7587 application.

Several ways are available to implement the central guardian element of the current invention. These include, but are not limited to, digital computer systems, programmable controllers, or field programmable gate arrays. Therefore other embodiments of the present invention are the program instructions resident on computer readable media which when implemented by such controllers, enable the controllers to implement embodiments of the present invention. Computer readable media include any form of computer memory, including but not limited to magnetic disk or tape, CD-ROMs, DVD-ROMs, or any optical data storage system, flash ROM, non-volatile ROM, or RAM.

A number of embodiments of the present invention have been described. Although specific embodiments have been illustrated and described herein, it will be appreciated by those of ordinary skill in the art that any arrangement, which is calculated to achieve the same purpose, may be substituted for the specific embodiment shown. It will be understood that various modifications to the described embodiments may be made without departing from the scope of the claimed invention. This application is intended to cover any adaptations or variations of the present invention. Therefore, it is manifestly intended that this invention be limited only by the claims and the equivalents thereof.

What is claimed is:

1. A multi-channel network having priority based arbitration, the network comprising:
    a plurality of nodes, wherein each of the plurality of nodes is adapted to transmit and receive data;
    two or more hubs, each hub having communication links with the plurality of nodes, wherein the communication links between any one hub and the plurality of nodes defines a channel of the multi-channel network;
    wherein each node is adapted to communicate with at least one other node through the two or more hubs; and
    two or more guardians, wherein each guardian is associated with one of the two or more hubs;
    wherein each node is adapted to transmit during a time slot;
    wherein for each channel of the multi-channel network, each node is assigned a unique priority rank;
        wherein for a first channel of the multi-channel network, the unique priority rank for each of the plurality of nodes is assigned in an increasing priority rank order;
        wherein for a second channel of the multi-channel network, the unique priority rank for each of the plurality of nodes is assigned in a decreasing priority rank order; and
    wherein, when two or more nodes of the plurality of nodes attempt to transmit during the same time slot, each of the two or more guardians determines which of the two or more nodes of plurality of nodes is permitted to transmit data during the associated time slot by permitting only a winning node with the highest assigned priority rank to transmit through the associated channel.

2. The network of claim 1, further comprising: one or more electronic devices in communication with the plurality of nodes, wherein the one or more electronic devices include one or more of: sensors, processors, actuators, controllers, and input devices.

3. The network of claim 1, wherein the multi-channel network is a TDMA network and the time slot is a TDMA slot.

4. The network of claim 1, wherein the multi-channel network is a TTP/C protocol network.

5. The network of claim 1, wherein each of the two or more guardians is located within an associated hub of the two or more hubs.

6. The network of claim 1, wherein each node of the plurality of nodes transmits an preamble signal to the two or more guardians to indicate the intention to transmit.

7. The network of claim 6, wherein preamble signals are transmitted from each node of the plurality of nodes to the two or more guardians on communication links carrying data.

8. The network of claim 6, wherein preamble signals are transmitted from each node of the plurality of nodes to the two or more guardians on communication links other than communication links carrying data.

9. The network of claim 6, wherein each guardian is adapted to observe the receipt of a first preamble signal from a first node of the plurality of nodes;
    wherein when the receipt of a second preamble signal from a second node of the plurality of nodes is observed within a predefined time interval, each guardian permits only one of the first node or the second node to transmit through the associated channel;
    wherein each guardian permits the first node to transmit if the first node has a higher priority rank than the second node;
    wherein each guardian permits the second node to transmit if the second node has a higher priority rank than the first node;
wherein when the receipt of a second preamble signal is not observed within the predefined time interval, each guardian permits the first node to transmit through the associated channel.

10. The network of claim 9, wherein the predefined time interval is equal to pi.

11. The network of claim 9, wherein the predefined time interval is equal to pi plus a signal propagation delay constant.

12. The network of claim 1, wherein each guardian further comprises:
    a memory, wherein the unique priority ranking for each node of the plurality of nodes is stored in the memory.

13. The network of claim 12, wherein the memory can be reprogrammed to change unique priority ranking for each node of the plurality of nodes.

14. The network of claim 13, wherein the memory can be reprogrammed through the plurality of nodes.

15. The network of claim 1, wherein each hub further comprises:
    a plurality of ports, wherein each node of the plurality of nodes is coupled to each hub of the two or more hubs through one port;

wherein, the unique priority ranking for each node of the plurality of nodes is determined by which port of the plurality of ports, it is coupled to.

16. The network of claim 1, wherein each guardian of the two or more guardians is synchronized with the plurality of nodes though a plurality of beacons transmitted by a plurality of the plurality of nodes.

17. The network of claim 1, wherein nodes of the plurality of nodes and the two or more guardians are adapted to implement port driven authentication;
   wherein when nodes of the plurality of nodes receive differing data on diverse channels, the nodes of the plurality of nodes accept data only from an authorized node;
   wherein the authorized node is the node of the plurality of nodes authorized by protocol to transmit during the time slot.

18. A method of priority based arbitration for a central guardian of an associated channel of a TDMA multi-channel network, the method comprising:
   observing the receipt of a first preamble signal indicating the intention of a first node of the plurality of nodes to transmit during a time slot;
   observing the receipt of a second preamble signal indicating the intention of a second node of the plurality of nodes to transmit during the time slot within a predefined time interval of observing the receipt of the first preamble signal;
   when the first node has a higher priority rank than the second node, allowing only the first node to transmit through the associated channel during the time slot; and
   when the second node has a higher priority rank than the first node, allowing only the second node to transmit through the associated channel during the time slot;
   wherein for a first channel of the multi-channel network, the unique priority rank is assigned to each of the plurality of nodes in an increasing priority rank order; and
   wherein for a second channel of the multi-channel network, the unique priority rank is assigned to each of the plurality of nodes in a decreasing priority rank order.

19. A non-transitory computer-readable medium having computer-executable instructions for performing a method of priority based arbitration for a central guardian of an associated channel of a TDMA multi-channel network, the method comprising:
   observing the receipt of a first preamble signal indicating the intention of a first node of the plurality of nodes to transmit during a time slot;
   observing the receipt of a second preamble signal indicating the intention of a second node of the plurality of nodes to transmit during the time slot within a predefined time interval of observing the receipt of the first preamble signal;
   when the first node has a higher priority rank than the second node, allowing only the first node to transmit through the associated channel during the time slot; and
   when the second node has a higher priority rank than the first node, allowing only the second node to transmit through the associated channel during the time slot;
   wherein for a first channel of the multi-channel network, the unique priority rank is assigned to each of the plurality of nodes in an increasing priority rank order; and
   wherein for a second channel of the multi-channel network, the unique priority rank is assigned to each of the plurality of nodes in a decreasing priority rank order.

* * * * *